United States Patent [19]

Chancellor

[11] Patent Number: 4,872,254
[45] Date of Patent: Oct. 10, 1989

[54] WHEEL STUD INSTALLER AND METHOD

[76] Inventor: James C. Chancellor, 300 NE. 12th St., Big Spring, Tex. 79720

[21] Appl. No.: 319,986

[22] Filed: Mar. 7, 1989

[51] Int. Cl.[4] .................... B23P 19/02; B23P 19/04
[52] U.S. Cl. ....................................... 29/525; 29/252; 254/29 R
[58] Field of Search ............... 29/525, 159.3, 252; 254/18, 29 R, 93 R; 188/218

[56] References Cited

U.S. PATENT DOCUMENTS

| | | | |
|---|---|---|---|
| 2,087,907 | 7/1937 | Gottlieb et al. | 29/159.3 X |
| 2,475,040 | 5/1949 | Mandl | 29/252 |
| 2,866,370 | 12/1958 | Biach | 29/252 UX |
| 3,034,611 | 5/1962 | Zenzic | 29/525 UX |
| 3,593,401 | 7/1971 | Chirco | 29/252 |
| 3,699,637 | 10/1972 | Rosiek | 29/525 X |
| 3,914,844 | 10/1975 | Norwood | 29/252 X |
| 4,087,896 | 5/1978 | Salter | 29/256 |
| 4,679,315 | 7/1987 | Overbay | 29/252 X |

Primary Examiner—Charlie T. Moon
Attorney, Agent, or Firm—Ross, Howison, Clapp & Korn

[57] ABSTRACT

Apparatus for seating a wheel stud in a hub, the apparatus preferably comprising a cylindrical spacer sleeve having an axial bore, a stud coupling and a cylinder coupling adapted to be coaxially adapted within the axial bore, and a hydraulic cylinder; the cylinder coupling and stud coupling being further adapted to releasably engage the wheel stud to the hydraulic cylinder, and the hydraulic cylinder being adapted to exert sufficient pulling pressure on the wheel stud relative to the hub to fully seat the wheel stud in the hub.

8 Claims, 2 Drawing Sheets

WHEEL STUD INSTALLER AND METHOD

TECHNICAL FIELD

This invention relates to a hydraulically actuated pulling apparatus, and more particularly, to apparatus for installing wheel studs in the hubs of motor vehicles.

BACKGROUND OF THE INVENTION

The use of threaded wheel studs and lugs for securing wheels to hubs on the axles of motor vehicles is well-known. Such studs are typically installed by inserting them through circumferentially spaced bores in a hub to which a wheel is to be attached. One end of conventional wheel studs typically comprises a head and an adjacent shaft portion adapted to be driven into tight frictional engagement with a hub bore. The other end of the wheel stud is adapted to be inserted through a coaxially-aligned bore in tee wheel that is intended to be mounted on the hub. An appropriately sized lug is thereafter threadedly secured to the wheel stud to hold the wheel against the hub. The length, diameter, thread configuration, number and circumferential spacing of the wheel studs needed to secure a wheel to a hub can vary according to numerous factors including, for example, the type, make and size of vehicle, the intended use, the hub and wheel configuration, and the like.

It is not uncommon for wheel studs to be bent, broken or stripped during use or when lugs are tightened using air wrenches. In the past, the installation of a new wheel stud has typically required removing the hub from the axle, securing it in a vise or the like, and thereafter inserting the threaded portion of the wheel stud outwardly through a bore in the hub, and driving the head end of the wheel stud into tight frictional engagement with the hub. Most often, wheel studs are driven into tight frictional engagement with a hub by pounding on the head of the stud with a hammer. Unfortunately, this method of installation frequently causes the studs to be bent or misaligned during installation, or causes damage to the threads. The mechanical stresses caused by these problems in turn lead to further failures during use.

The difficulties associated with replacing damaged or broken wheel studs, particularly with large trucks, has led to the use of "dummy studs" in an effort to avoid detection by regulatory authorities. Unfortunately, the use of such "dummy studs" is dangerous and increases the risk of accident and injury to other motor vehicle users sharing the roadways.

An apparatus and method for installing wheel studs are therefor needed that do not require a wheel stud to be pounded into frictional engagement with a hub, and that avoid the need for removing the hub from the axle to install a new stud.

SUMMARY OF THE INVENTION

According to the present invention, an improved method and apparatus are provided for installing wheel studs in hubs.

According to one embodiment of the invention, the subject apparatus preferably comprises a stud coupling further comprising means for threadedly engaging a wheel stud and means for releasably engaging a slotted sleeve, a slotted sleeve further comprising means for engaging a stud coupling and means for engaging a hydraulic cylinder, and a spacer means adapted to maintain separation between the hydraulic cylinder and a hub during installation of the wheel stud into the hub.

According to another embodiment of the invention, the subject apparatus preferably comprises a pressure gauge in fluid communication with the hydraulic cylinder to enable the user to ascertain the hydraulic fluid pressure druing installation of a wheel stud.

According to another embodiment of the invention, apparatus is provided for seating a wheel stud in a hub, the apparatus preferably comprising a substantially cylindrical spacer sleeve having an axial bore, a stud coupling and a cylinder coupling adapted to be coaxially disposed within the axial bore, and a hydraulic cylinder, the cylinder coupling and stud coupling being further adapted to releasably engage the wheel stud to the hydraulic cylinder, and the hydraulic cylinder being adapted to exert sufficient pulling pressure on the wheel stud relative to the hub to fully seat the wheel stud to the hub.

According to another embodiment of the invention, a method for installing wheel studs is provided, preferably comprising the steps of inserting a threaded wheel stud outwardly through a hub bore, releasably attaching a stud coupling to that portion of the wheel stud extending outwardly through the hub, releasably attaching a cylinder coupling to the stud coupling, slidably disposing a spacer sleeve over the stud coupling and the cylinder coupling, releasably attaching an axially extendable, hydraulically actuated member to the cylinder coupling, thereafter causing the hydraulically actuated member to exert a pulling force on the wheel stud relative to the hub through the cylinder coupling and stud coupling.

The method and apparatus disclosed herein are useful for installing wheel studs in hubs without requiring removal of the hub from the associated axle. The subject invention will also facilitate the steady application of a pulling force to a wheel stud to facilitate complete seating of the wheel stud in a hub in the proper positional alignment without subjecting the wheel stud to unintended deformation or damage.

BRIEF DESCRIPTION OF DRAWINGS

The method and apparatus of the invention are further described and explained in relation to the following drawings wherein.

Like reference numerals are used to indicate like parts in all figures of the drawing.

DESCRIPTION OF THE PREFERRED EMBODIMENTS

Figure 1:
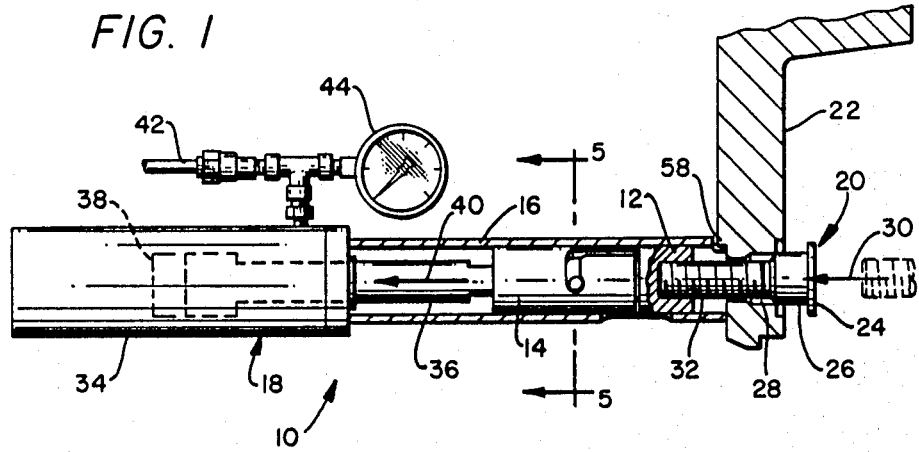
FIG. 1 depicts an elevation view, partially in section, of the apparatus of the invention being used to install a threaded wheel stud in a hub.
Figure 3:
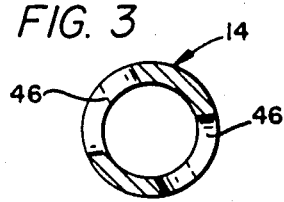
FIG. 3 is a cross-sectional view of the cylinder coupling of the invention taken along line 3—3 of FIG. 2.
Figure 4:
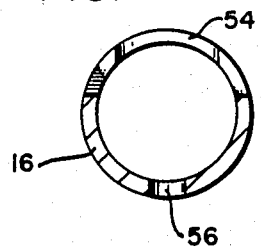
FIG. 4 is a cross-sectional view of the spacer sleeve of the invention taken along line 4—4 of FIG. 2.
Figure 5:
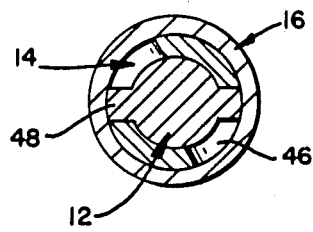
FIG. 5 is a cross-sectional view of the assembled stud coupling, cylinder coupling, and spacer sleeve of the invention taken along line 5—5 of FIG. 1.
Figure 2:
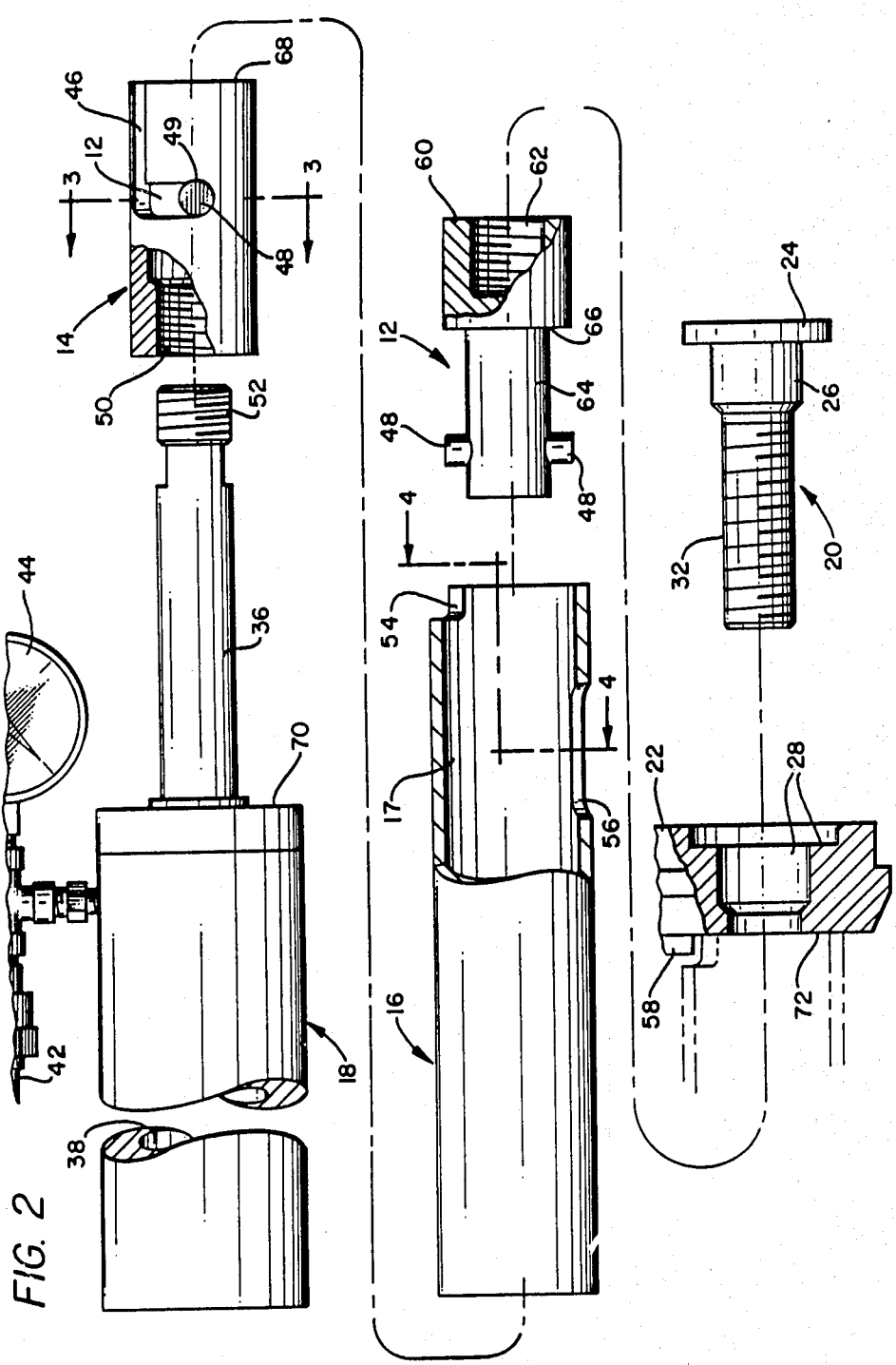
FIG. 2 is an enlarged, exploded elevation view, partially in section, better depicting the manner in which the components of the subject apparatus are assembled.

Referring now to FIG. 1, wheel stud installer 10 of the invention preferably comprises stud coupling 12, cylinder coupling 14 and spacer sleeve 16. Because cylinder coupling 14 preferably comprises means for releasably engaging an axially extendable, hydraulically actuated member, stud installer 10 can also optionally comprise axially extendable, hydraulically actuated cylinder 18 adapted to cooperate with stud coupling 12, cylinder coupling 14 and spacer sleeve 16 in exerting a pulling force on wheel stud 20 relative to hub 22 as wheel stud 20 is inserted through hub 22 to properly seat head 24 and shank 26 of wheel stud 20 in stepped bore 28 of hub 22. Arrow 30 depicts the direction from which threaded section 32 of wheel stud 20 is inserted through step 428 of hub 22. Axially extendable, hydraulically actuated member 18 preferably further comprises body 34 having piston 36 slidably disposed in cylinder 38, and being operable so as to exert a force in the direction indicated by arrow 40 on wheel stud 20 when operably coupled according to the method of the invention. Piston 36 is preferably actuated by hydraulic fluid pumped into body 34 through line 42 at a pressure sufficient to fully seat wheel stud 20 in graduated bore 28 of hub 22 as monitored by a pressure gauge 44. For ease of explanation, the axially extendable, hydraulically actuated member 18, comprising body 34, piston 36, cylinder 38, fluid supply line 42 and pressure gauge 44 are hereinafter collectively referred to as hydraulic cylinder 18.

The apparatus of the invention and the manner in which it is utilized in the method of the invention are further described and explained in relation to FIGS. 1–5 of the drawings. To install a wheel stud using the method and apparatus of the invention, threaded section 32 of wheel stud 20 is first inserted through graduated bore 28 of hub 22 so that the threads are facing outward through the hub for threaded engagement with a wheel lug, not shown. Wheel stud 20 is considered to be fully seated in hub 22 when shank 26 and head 24 are fully seated in the corresponding sections of graduated bore 28 of hub 22. Because of the tight fit that is necessary between wheel stud 20 and hub 22, a great amount of force must be applied to achieve complete seating. As previously discussed, the conventional method for seating wheel stud 20 in hub 22 has been to remove hub 22 from the corresponding axle, not shown, and thereafter drive wheel stud 20 into graduated bore 28 by pounding on head 24 with a hammer, or the like. With the present invention, threads 32 are inserted through graduated bore sufficiently that they can be threadedly engaged by internal threads 62 of larger diameter section 60 of stud coupling 12.

Once stud coupling 12 has been threaded onto wheel stud 20, cylinder coupling 14 is preferably operatively coupled to piston 36 of hydraulic cylinder 18 by threading internal threads 50 of <cylinder coupling 14 onto external threads 52 of piston 36.

Spacer sleeve 16 is thereafter slidably disposed over stud coupling 12 in such manner that notch 54 of spacer sleeve 16 is aligned with shoulder 58, if any, on hub 22. Spacer sleeve 16 desirably comprises a cylindrical bore 17 having sufficient length in diameter to accommodate stud coupling 12 and cylinder coupling 14 as shown in FIG. 1. Once spacer sleeve 16 is slidably disposed over stud coupling 12, cylinder coupling 14, now threadedly engaged to hydraulic cylinder 18 is inserted into the distil end of spacer sleeve 16. The rotational alignment of cylinder coupling 14 within spacer sleeve 16 is desirably such that diametrically J-slots 46 in stud coupling 14 are longitudinally aligned with pins 48 on smaller diameter shank portions 64 of stud coupling 12. At least one window 56 is desirably provided in spacer sleeve 16 to facilitate viewing the engagement of ends 48 of stud coupling 12 in J-slots 46 of cylinder coupling 14. Once the open end of J-slots 46 have engaged pins 48, hydraulic cylinder 18 and cylinder coupling 14 are desirably pushed forward and rotated so as to achieve locking of pins 48 in detents 49 of J-slots 46.

Although the procedure for assembling stud coupling 12, cylinder coupling 14, spacer sleeve 16, hydraulic cylinder 18 and wheel stud 20 for installing wheel stud 20 in hub 22 is described above in relation to a preferred embodiment for practicing the method of the invention, it will be understood that the elements of the invention can be otherwise assembled to achieve the desired result. Thus, for example, one can thread stud coupling 12 onto stud 20, slide cylinder coupling 14 into engagement with stud coupling 12, slide spacer sleeve over piston 36, and thereafter threadedly engage piston 36 to cylinder coupling 14. Alternatively, cylinder coupling 14, stud coupling 12 and spacer sleeve 16 can all be assembled over piston 36 and hydraulic cylinder 18 can thereafter be rotated to threadedly engage stud coupling 12 to threads 32 of wheel studs 20.

Also, while the components of the invention are disclosed in relation to their preferred embodiments, it will be apparent to one upon reading this disclosure that other means for obtaining releasable engagement between piston 36 and cylinder coupling 14 and between cylinder coupling 14 and stud coupling 12 can be similarly utilized within the scope of the invention. It is also seen that while spacer sleeve 16 is disclosed in its preferred embodiment as being a substantially continuous cylinder, thereby affording protection to the user should stud coupling 12 become disengaged from stud 20, or should cylinder coupling 14 become disengaged from stud coupling 12, or should hydraulic cylinder 18 become disengaged from cylinder coupling 14 during use, other structures can be similarly utilized. In order that force exerted by hydraulic cylinder 18 can be uniformly applied to wheel stud 20, it is preferred that spacer sleeve 16 or any equivalent member utilized within the scope of the invention to perform its function be adapted to abut and firmly seat against both shoulder 70 of hydraulic cylinder 18 and outwardly extending face 72 of hub 22. Likewise, shoulder 66 of large diameter portion 60 of stud coupling 12 is desirably adapted to be placed in abutting contact with shoulder 68 of cylinder coupling 14 whenever pin 48 is fully engaged in J-slot 46.

Because commercial trucks typically employ left-handed threads on the left side and right-handed threads on the right side, oppositely threaded stud couplings 12 can be provided for use as appropriate. Similarly, because the steering wheels of large trucks typically utilize 1⅛ inch diameter studs while the rear wheels of trucks typically utilize ⅞ inch diameter studs, stud couplings 12 having internally threaded portion 62 of various diameters can be provided, corresponding to the various applications. In such instances, however, the outside diameter of large diameter portion 60 of stud coupling 12 must still be sized so as to permit insertion of stud coupling 12 into the bore of spacer sleeve 16 or into such other equivalent structure as may be provided.

According to a preferred embodiment of the invention, a hydraulic cylinder 18 employing pressure gauge 44 capable of registering pressures up to 5,000 pounds per square inch has proved satisfactory for use in installing wheel studs for trucks as described above. More particularly, gauge pressures of about 4,800 pounds per square inch have proved to be satisfactory for fully seating 1⅛ inch diameter studs used on steering wheels for large trucks, and 3,500 pounds per square inch of gauge pressure has proved to be satisfactory for fully seating lugs utilized with the back wheels of such trucks.

Other alterations and modifications of the apparatus and method disclosed herein will become apparent to one of ordinary skill in the art upon reading the present disclosure, and it is intended that the invention be limited only by the broadest interpretation of the appended claims to which the inventor is legally entitled.

I claim:

1. Apparatus for installing threaded wheel studs in a vehicular hub, said apparatus comprising a hydraulic actuator means, a stud coupling, a cylinder coupling, and a spacer sleeve;

said stud coupling further comprising means for threadedly engaging said wheel stud and means for releasably engaging said cylinder coupling;

said cylinder coupling comprising means for releasably engaging said stud coupling and means for releasably engaging actuator means adapted to exert a pulling force on said wheel stud through said cylinder coupling and said stud coupling; and said spacer sleeve further comprising a longitudinal bore adapted to receive said stud coupling and said cylinder coupling when said stud coupling and said cylinder coupling are engaged, and said spacer sleeve being further adapted to maintain said actuator means a fixed distance from said hub as said pulling force is exerted on said wheel stud.

2. The apparatus of claim 1 wherein said stud coupling further comprises diametrically opposed, radially extending pins, and wherein said cylinder coupling comprises means for receiving and releasably engaging said pins.

3. The apparatus of claim 2 wherein said means in said cylinder coupling for releasably engaging said pins in said stud coupling are diametrically opposed J-slots.

4. The apparatus of claim 1 said actuator means further comprises a hydraullically extendable member and wherein said cylinder coupling further comprises means for releasably engaging said hydraulically extendable member.

5. The apparatus of claim 1 wherein said spacer sleeve further comprises a circumferentially extending notch adapted to permit said spacer sleeve to be placed in abutting and perpendicular relationship to said vehicular hub around substantially the entire circumference of said wheel stud.

6. The apparatus of claim 1, wherein said spacer sleeve further comprises a adapted for viewing the engagement between said stud coupling and said cylinder coupling.

7. A method for installing a wheel stud in a vehicular hub, said method comprising the steps of:
   a. inserting a wheel stud outwardly through said vehicular hub;
   b. providing an apparatus comprising a stud coupling a cylinder coupling, and a spacer sleeve for use in seating said wheel stud in said vehicular hub;
   c. threadedly engaging said stud coupling to said wheel stud, and releasably engaging said stud coupling to said cylinder coupling;
   d. providing a longitudinally extendable, hydraulically actuated means adapted to exert a pulling force on said wheel stud through stud coupling and said cylinder coupling;
   e. said spacer sleeve over said stud coupling and said cylinder coupling;
   f. releasably engaging said hydraulically actuated means to said cylinder coupling; and
   g. thereafter operating said hydraulically actuated means to exert a pulling force on said wheel stud through said stud coupling and said cylinder coupling.

8. The method of claim 7, further comprising the step of placing said spacer sleeve in abutting contact with both said actuator means and said vehicular hub prior to exerting said pulling force on said wheel stud.

* * * * *

UNITED STATES PATENT AND TRADEMARK OFFICE
CERTIFICATE OF CORRECTION

PATENT NO. : 4,872,254

DATED : October 10, 1989

INVENTOR(S) : James C. Chancellor

It is certified that error appears in the above-identified patent and that said Letters Patent is hereby corrected as shown below:

Column 3, Line 27
    After FIGS., 15 should be -- 1-5 --

Column 3, Line 51
    After of, delete [ < ]

Column 6, Line 13
    After a, insert -- window --

Column 6, Line 30
    After e. insert -- sliding --

Signed and Sealed this

Twenty-fifth Day of December, 1990

Attest:

HARRY F. MANBECK, JR.

*Attesting Officer*      *Commissioner of Patents and Trademarks*